United States Patent [19]

Labock

[11] Patent Number: 5,229,204
[45] Date of Patent: Jul. 20, 1993

[54] BULLET-RESISTANT TRANSPARENT PANEL, AND METHOD AND PRESS FOR MAKING SAME

[75] Inventor: Joseph Labock, Bat Yam, Israel

[73] Assignee: ArmorVision Plastics & Glass, Los Angeles, Calif.

[21] Appl. No.: 843,337

[22] Filed: Feb. 28, 1992

[51] Int. Cl.⁵ .................. B32B 7/12; E04B 2/02
[52] U.S. Cl. ...................... 428/335; 109/10; 109/49.5; 109/80; 428/412; 428/424.4; 428/911
[58] Field of Search ............. 109/5, 10, 49.5, 80; 428/335, 412, 424.4, 911

[56] References Cited

U.S. PATENT DOCUMENTS

| | | | |
|---|---|---|---|
| 4,243,719 | 1/1981 | Holmes | 340/550 |
| 4,594,290 | 6/1986 | Fischer et al. | 109/80 X |
| 4,908,083 | 3/1990 | Hall | 428/412 X |

*Primary Examiner*—Lloyd A. Gall
*Attorney, Agent, or Firm*—Blakely, Sokoloff, Taylor, Zafman

[57] ABSTRACT

A transparent panel having unidirectional bullet-resisting characteristics, comprises an outer transparent panel of an acrylic resin; an inner transparent sheet of a polycarbonate resin; and a transparent adhesive bonding the two sheets together. Also described are a method of making such a panel, and presses useful in making such a panel.

5 Claims, 3 Drawing Sheets

5,229,204

BULLET-RESISTANT TRANSPARENT PANEL, AND METHOD AND PRESS FOR MAKING SAME

FIELD AND BACKGROUND OF THE INVENTION

The present invention relates to a bullet-resistant transparent panel, and also to a method and presses for making such a panel.

Many types of bullet-resistant transparent panels are known. One type, as described for example in U.S. Pat. No. 4,594,290, includes transparent sheets of acrylic and polycarbonate resins bonded together by a transparent polyurethane adhesive. The invention of the present application is directed particularly to the latter type of bullet-resistant transparent panel.

OBJECTS AND BRIEF SUMMARY OF THE INVENTION

An object of the present invention is to provide a transparent panel, particularly of the type described in U.S. Pat. No. 4,594,290, exhibiting unidirectional bullet-resisting characteristics; that is, the panel blocks the penetration of a bullet when fired from the outer side of the panel, but not when fired from the inner side of the panel.

Another object of the invention is to provide a method of making transparent panels, and a further object is to provide a press particularly useful for making such transparent panels.

According to the present invention, there is provided a transparent panel effective to block the penetration of a bullet when fired from the outer side of the panel but not when fired from the inner side of the panel, the transparent panel comprising: an outer transparent sheet of an acrylic resin having a thickness of 7.5–9 mm, and an inner transparent sheet of a polycarbonate resin having a thickness of 9.5–11 mm, the sheets being bonded together by a polyurethane transparent adhesive.

It has been surprisingly found, as will be shown more particularly below, that when the acrylic and polycarbonate sheets are of the above thicknesses, the laminated panel exhibits unidirectional bullet-resisting characteristics. Such a panel construction thus provides protection against outsiders attacking persons inside an enclosure, such as a vehicle, a protective teller's cage, or the like; but at the same time the panel permits insiders to fire against the attacking outsiders.

Best results were obtained when the outer acrylic resin sheet has a thickness of about 8 mm, the inner polycarbonate resin sheet has a thickness of about 10 mm, and the transparent polyurethane adhesive has a thickness of about 2 mm.

According to another aspect of the present invention, there is provided a method of making a transparent panel, comprising forming a sheet of an acrylic resin and a sheet of a polycarbonate resin of the same size and configuration; applying a sealing strip around the peripheral edge of one of the sheets; applying the other sheet over the one sheet with the two sheets spaced from each other by the sealing strip; drilling two holes through one of the sheets adjacent its diagonally opposite edges; applying pressure to the opposite faces of the two sheets to press them against the sealing strip; injecting under pressure an adhesive liquid through one hole of the one sheet until it exits from the other hole thereof; and permitting the adhesive to harden to bond the two sheets together.

According to a still further aspect of the present invention, there is provided a press for laminating a plurality of sheets, comprising: a fixed frame assembly, and a movable frame assembly movable with respect to the fixed frame assembly; each of the frame assemblies including a plurality of parallel pressure bars extending transversely across the respective frame; the press further including a plurality of adjustable devices for precisely positioning the pressure bars against the opposite surfaces of the panel.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
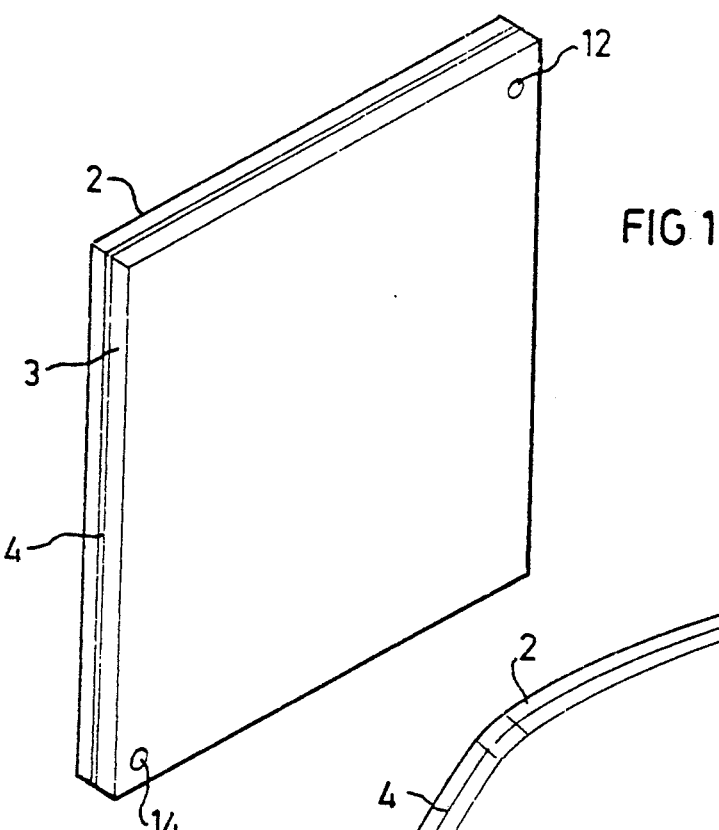
FIG. 1 illustrates a flat transparent panel constructed in accordance with the present invention.

The bullet-resistant panel illustrated in FIG. 1 is constituted of an outer transparent sheet 2 of an acrylic resin, an inner transparent sheet 3 of a polycarbonate resin, and a transparent polyurethane adhesive 4 between the two sheets bonding them together to form an integral panel.

The acrylic resin sheet 2 has a high degree of hardness, but is somewhat brittle. On the other handle, the polycarbonate resin sheet 3 is less hard than the acrylic resin sheet, but is also less brittle. By using the combination of the two sheets to form the panel, the outer acrylic resin sheet 2 imparts a high degree of hardness to the outer face of the panel receiving an impact, such as a bullet, rock or the like, and attenuates the force of this impact; whereas the polycarbonate resin sheet 3 on the inner face of the panel absorbs the attenuated force and supports the acrylic resin sheet 2 against breaking or shattering. The combination of the two sheets thus provides a high degree of resistance against penetration or shattering by bullets, stones, rocks or the like.

It has been surprisingly found that the panel illustrated in FIG. 1 can be provided with unidirectional bullet-resisting characteristics if the two resin sheets 2 and 3 are made of predetermined thicknesses. Thus, by making the outer acrylic resin sheet 2 of a thickness of 7.5–9 mm, and the inner polycarbonate resin sheet 3 of a thickness of 9.5–11 mm, the panel has been found to block the penetration of a 9 mm bullet when fired from the side of the outer acrylic resin sheet, but not when fired from the side of the inner polycarbonate resin sheet.

Table 1 below summarizes the results of a number of tests that were conducted on laminations of polycarbonate and acrylic sheets of different thicknesses when impacted by a bullet shot from an Uzi 9 mm full metal jacket (FMG); velocity 359.6 m/sec; distance of 3 meters; temperature of 17°–25° C. at time of test:

TABLE 1

| ACRYLIC | POLYCAR-BONATE | RESULTS Shot from Acrylic Side | Shot from Polycarbonate Side |
|---|---|---|---|
| 1. 8 mm | 6 mm | Passed through | Passed through |
| 2. 8 mm | 8 mm | Blocked but produced a "mushroom" deformation in the polycarbonate side | Passed through |
| 3. 8 mm | 10 mm | Blocked | Passed through |
| 4. 8 mm | 12 mm | Blocked | Blocked |
| 5. 6 mm | 10 mm | Passed through | Passed through |
| 6. 10 mm | 10 mm | Blocked | Blocked |

The polycarbonate sheet was that supplied by Tsutsunaka of Japan under the trademark Sunloid PC; and the acrylic sheet was a cast acrylic sheet supplied by Mitsubishi of Japan, the polycarbonate and acrylic sheets having the properties as set forth in the following Table 2:

TABLE 2

| Properties | Polycarbonate | Acrylic |
|---|---|---|
| Specific gravity | 1.2 | 1.20 |
| Rockwell hardness | R119 | R124 |
| Tensile strength | 650 kgf/cm$^2$ | 720–770 kgf/cm$^2$ |
| Elongation | 85% | 4–7% |
| Compressive strength | 830 kgf/cm$^2$ | 160–250 kgf/cm$^2$ |
| Flexural strength | 950 kgf/cm$^2$ | 1100–1200 kgf/cm$^2$ |
| Flexural modulus | 24000 kgf/cm$^2$ | 30000–31000 kgf/cm$^2$ |
| Izod impact strength | 80 kgf · cm/cm | 2–3 kgf · cm/cm |
| Heat deflection temperature | 135° C. | 87–100° C. |
| Coefficient of linear thermal expansion | 7.0 cm/cm °C. × 10$^{-5}$ | 7–8 cm/cm °C. × 10$^{-5}$ |
| Total light transmittance | 87% | 92% |

The adhesive used was a clear liquid polyurethane adhesive as commonly available for bonding polycarbonate to itself, glass or metal; it had an elongation of about 300%, and was applied at a thickness of 2 mm.

As can be seen from the above, best results were obtained when the outer acrylic sheet is about 8 mm, the inner polycarbonate resin sheet 3 is about 10 mm, and the transparent adhesive layer 4 in between is transparent polyurethane adhesive having a thickness of about 2 mm. Preferably, each of the two sheets 2, 3 includes a scratch-resistant coating (many of which are known) on the face thereof not bonded to the other sheet.

Figure 2:
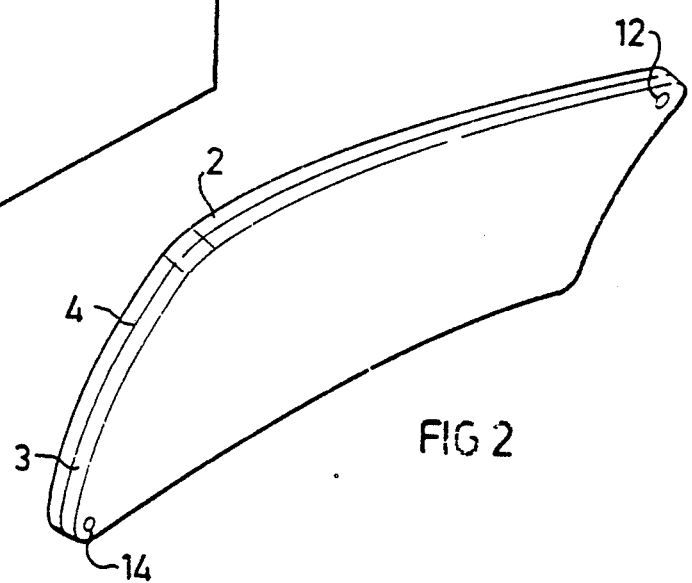
FIG. 2 illustrates a curved transparent panel constructed in accordance with the present invention.

FIG. 1 illustrates the transparent panel of a flat configuration, such as may be used for side windows on a vehicle, building windows, windows for protective cages, and the like. FIG. 2 illustrates the panel of the same construction as that illustrated in FIG. 1, but of a curved configuration, such as may be used for the front and/or back windshields of a vehicle.

Figure 3:
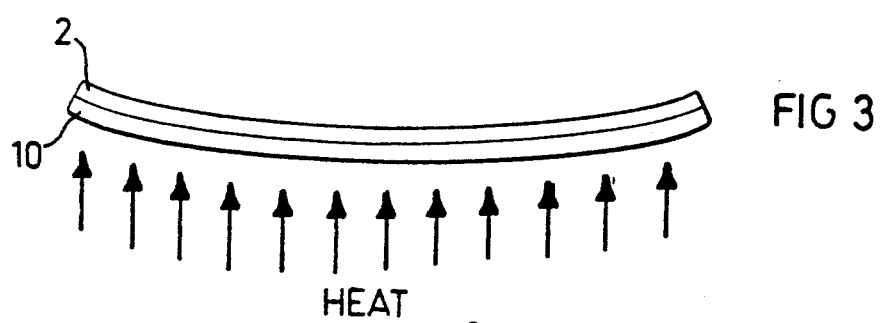
FIG. 3 illustrates the manner of precurving each of the resin sheets in making the curved panel of FIG. 2.
Figure 4:
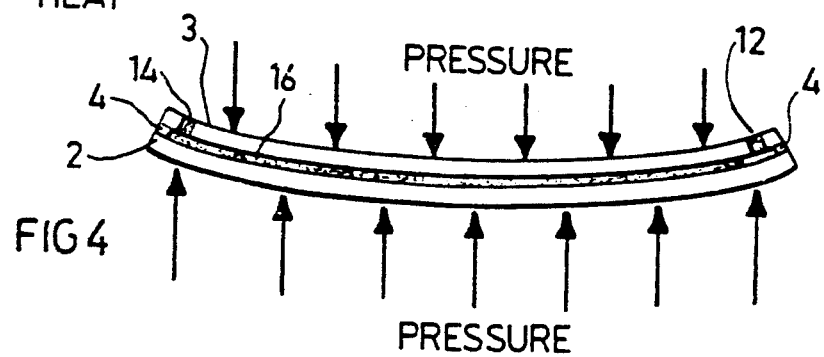
FIG. 4 illustrates the method of laminating the two resin sheets together in order to produce the curved panel of FIG. 2.
Figure 5:
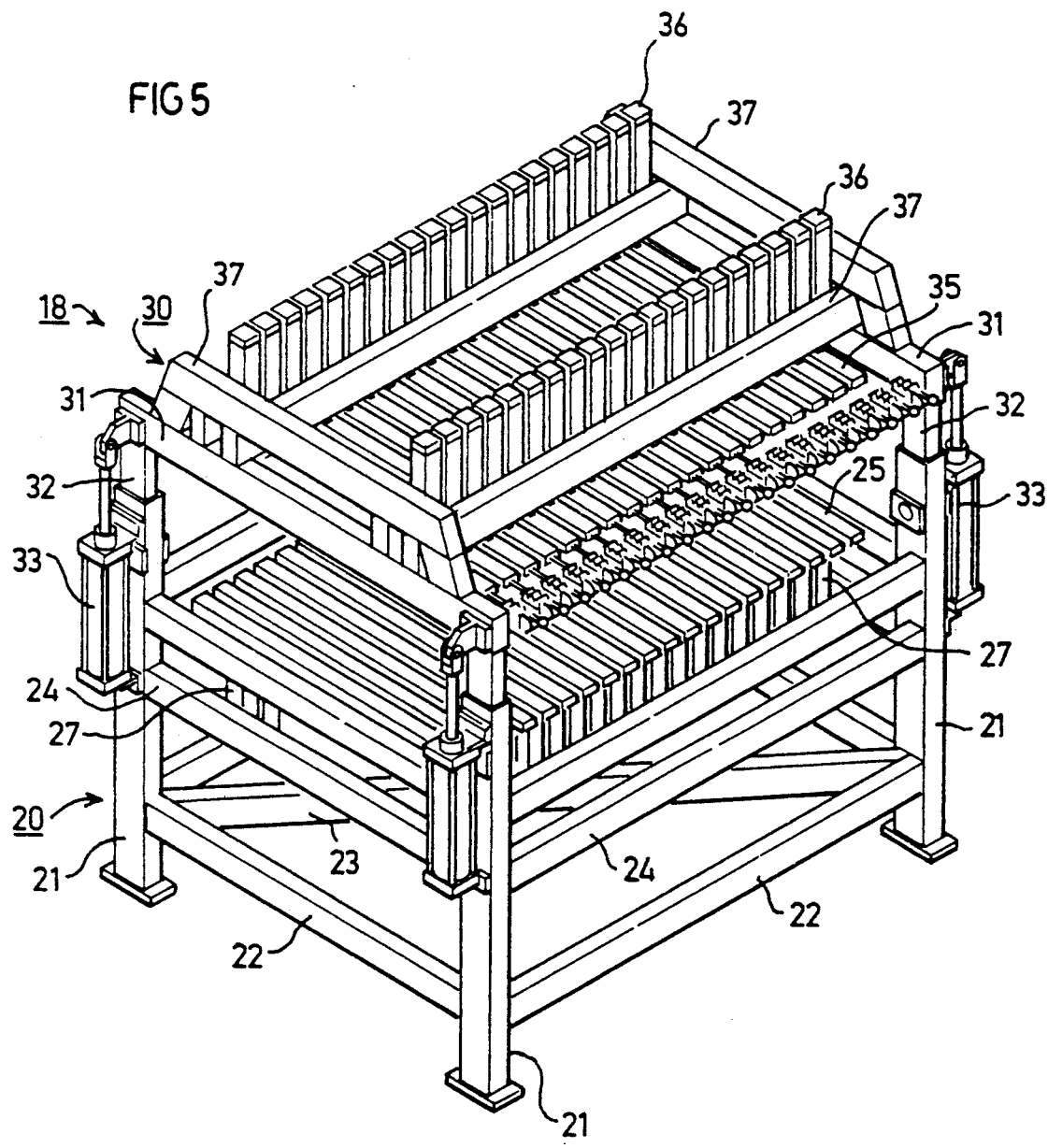
FIG. 5 illustrates a press useful in making the flat panel of FIG. 1 or the curved panel of FIG. 2.

FIGS. 3 and 4 illustrate a method, and FIG. 5 illustrates a press useful in the method, for making the curved panel of FIG. 2, but it will be appreciated that the method and press could also be used for making the flat panel of FIG. 1.

Thus each of the two resin sheets 2, 3 for making the panel is first cut according to the size and configuration of the panel to be produced, and is then precurved according to the curvature of the panel to be produced. FIG. 3 illustrates how each of the two resin sheets 2, 3 is precurved according to the curvature, e.g., of a windshield to be applied to a vehicle.

Thus, as shown in FIG. 3, a sheet of acrylic resin 2, having dimensions slightly larger than those of the windshield is supported on an actual glass windshield having the desired curvature (and serving as the reference model), and is heated to a temperature of about 140° C. This temperature is sufficiently high to soften the acrylic resin, but not the glass windshield 10. Accordingly, the acrylic resin sheet will assume the curvature of the glass windshield 10.

A sheet 3 of polycarbonate resin, also having dimensions slightly larger than those of the windshield 10, is supported on the windshield and is heated to a temperature of about 150° C. This temperature is sufficient to soften the polycarbonate resin sheet 3, but not the glass windshield 10, so that the polycarbonate resin sheet 3 thus also assumes the curvature of the glass windshield.

The curved acrylic resin sheet 2 is then supported with its concave face facing upwardly. A preformed sealing strip 4 is applied around the peripheral edge of the acrylic resin sheet 2. The polycarbonate resin sheet 3 is then applied over the sealing strip 4 so as to be spaced from the acrylic resin sheet 2 by the thickness of the sealing strip, 2 mm in this case. Two holes 12, 14 are drilled through the polycarbonate resin sheet 3 adjacent to two diagonal corners of the sheet (e.g., see FIG. 1). Pressure is then applied (FIG. 4) to the opposite faces of the two sheets to press them against the sealing strip 4, while an adhesive liquid 16 is injected under pressure through one hole (e.g., 12) until it is seen exiting from the other hole (e.g., 14), thereby assuring that the complete space between the two sheets 2, 3 is filled with the adhesive 6. The adhesive is then permitted to harden to bond the two sheets together.

Figure 6:
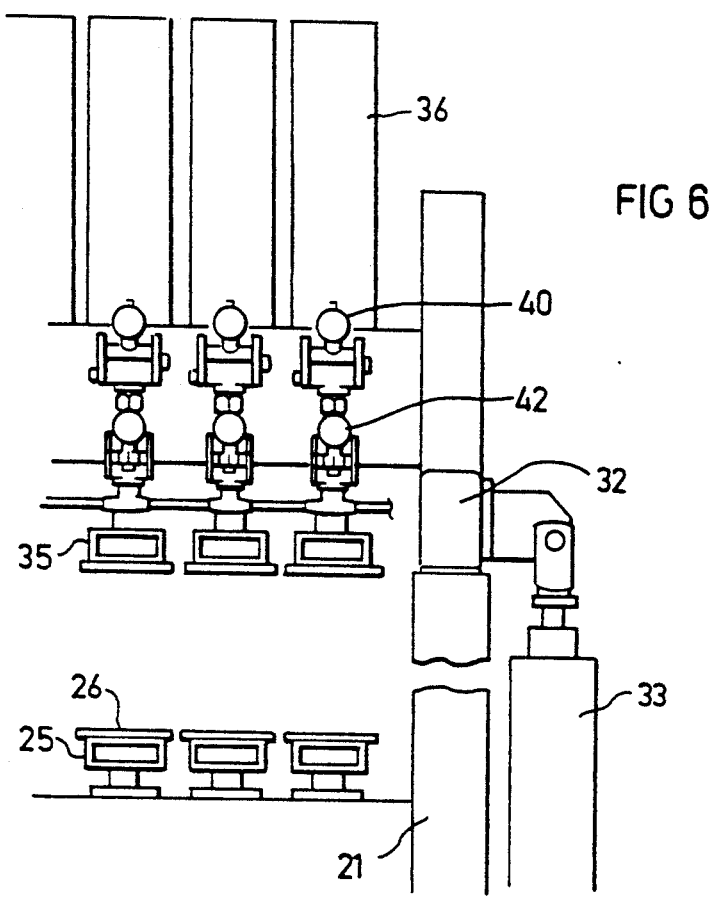
FIG. 6 is an enlarged fragmentary view of the press of FIG. 5.

The press illustrated in FIGS. 5 and 6, and therein designated 18, is used for applying the pressure to the two sheets at the time of injection of the adhesive liquid 16 between the two sheets, to prevent distortion of the two sheets by the pressure of the injected liquid. Press 18 illustrated in FIG. 5 comprises a fixed frame assembly, generally designated 20, and a movable frame assembly, generally designated 30, movable to an open position or to a closed position with respect to the fixed assembly 20. Both assemblies are of rectangular configuration of a size at least as large as, but preferably larger than, the largest panel to be produced.

The fixed frame assembly 20 comprises four vertical bars 21, one at each of the four corners of the frame assembly, joined together by four lower horizontal bars 22 braced by a diagonal bar 23, and four upper bars 24 which may be similarly braced by a diagonal bar (not shown). The fixed frame assembly 20 further includes a plurality of parallel pressure bars 25 extending transversely across the assembly for contacting the lower surface of the sheets to be bonded together and occupying the complete area of such sheets. Each of the pressure bars 25 includes an outer liner 26 (FIG. 6) of rubber or other resilient cushioning material which directly contacts the lower surface of the acrylic sheet to the polycarbonate sheet.

Each of the pressure bars 25 is mounted to the fixed frame assembly 20 by a cylinder-piston device 27 at each of the opposite ends of the pressure bar. The piston-cylinder devices permit each pressure bar to be located at a precise vertical position according to the curvature of the sheets to be bonded together.

The movable frame assembly 30 includes a rectangular frame of four horizontal bars 31 and four vertical bars 32 at the four corners telescopingly receivable within the vertical bars 21 of the fixed frame assembly 20, to permit the movable frame assembly 30 to be moved to an open position away from the fixed frame assembly, or to a closed position towards the fixed frame assembly. The movement of the movable frame assembly 30 is effected by four cylinder-piston devices 33 at the four corners of the press, each coupling one of the fixed vertical bars 21 to one of the movable vertical bars 32.

The movable frame assembly 30 further includes a plurality of parallel, horizontal pressure bars 35 extending transversely of the assembly, one for and aligned with one of the pressure bars 25 of the fixed frame assembly 20. Each of the pressure bars 35 is also mounted by a pair of cylinder-piston devices 36, permitting each such bar to be moved to a preselected vertical position, according to the curvature of the panel to be produced. The cylinder-piston devices 36 are mounted to an upper framework including four further horizontal bars 37.

As indicated earlier, the two groups of pressure bars 25 and 35 are each individually movable by their respective cylinder-piston devices 27 and 37 to appropriate vertical positions in accordance with the curvature of the panel to be produced. The pressure bars 25, 35 are moved to their respective vertical positions by a plurality of handles 40, one controlling all the cylinder-piston devices of one pressure bar 25 in the fixed frame assembly 20, and the aligned pressure bar 35 in the movable frame assembly 30. When the movable frame assembly 30 is moved to its closed position with respect to the fixed frame assembly 20, handles 40 are manually actuated to permit the pressure bars to be freely moved by their respective cylinder-piston devices 27, 37 until they contact the surface of the panel. The pressure bars are thus moved to their respective vertical positions according to the curvature of the panel. They are then fixed in those positions by further handles 42, one for each pair of aligned pressure bars 25, 35. When handles 42 are moved to their closed positions, they block the flow of the fluid to the respective cylinder-piston devices 27, 37, to thereby fix the pressure bars in position.

It will thus be seen that after the precurved polycarbonate resin sheet has been placed over the sealing strip 4 applied around the outer periphery of the acrylic resin sheet, the two sheets are then applied between the pressure bars 25 of the fixed frame assembly 20 and the pressure bars 35 in the movable frame assembly 30. The movable frame assembly 30 is then moved to its closed position, and handles 40 are actuated to move the two groups of pressure bars 25, 35 into contact with the two sheets of the panel such that the bars assume their respective vertical positions according to the curvature of the two sheets. The handles 42 are then actuated to block the flow of fluid from the cylinder-piston devices 27, 37, thereby fixing the pressure bars in their respective vertical positions according to the curvature of the two sheets.

The transparent liquid adhesive is then injected via one hole (e.g., 12) in the polycarbonate resin sheet 3 under high pressure to fill the space between the two sheets with the transparent adhesive, as shown at 16 in FIG. 4. The pressure injection of liquid adhesive continues until the adhesive begins to exit from the other hole 14 at a diagonally-opposed corner from opening 12, indicating that the complete space between the two sheets has been filled with the transparent adhesive. The two holes 12, 14 are located so as to be outside of the area covered by the pressure bars 25, 35, and thereby easily accessible for injecting the liquid adhesive. During this injection of the transparent adhesive, the two groups of pressure bars 25, 26 of the press illustrated in FIG. 5 are fixed in their respective vertical positions and prevent any distortion or displacement of the two sheets despite the high pressure of injection of the liquid adhesive.

After the complete space between the two sheets 2, 3 has been filled with the transparent adhesive, the two holes 12, 14 may be plugged, and the adhesive is permitted to harden to thereby firmly bond the two sheets together to produce the laminated assembly.

The liquid adhesive 16 is preferably one of the commercially-available cold-applied, transparent, polyurethane adhesives. The sealing strip 4 is preferably a transparent silicon tape of 2 mm thickness having a transparent polyurethane adhesive layer applied to its opposite faces. As one example, the adhesive may be formulation 1908E.P supplied by Engineering Chemicals B. V., Steenbergen, Netherlands, and may be injected at a pressure of about 1.5 to 2 atmospheres, although this pressure may be increased up to about 7 atmospheres in order to decrease the injection time.

Since the laminated panel is made of plastic sheets, the margins of the sheets may be trimmed or planed to fit the frame (e.g., windshield frame) in which they are to be applied.

Figure 7:
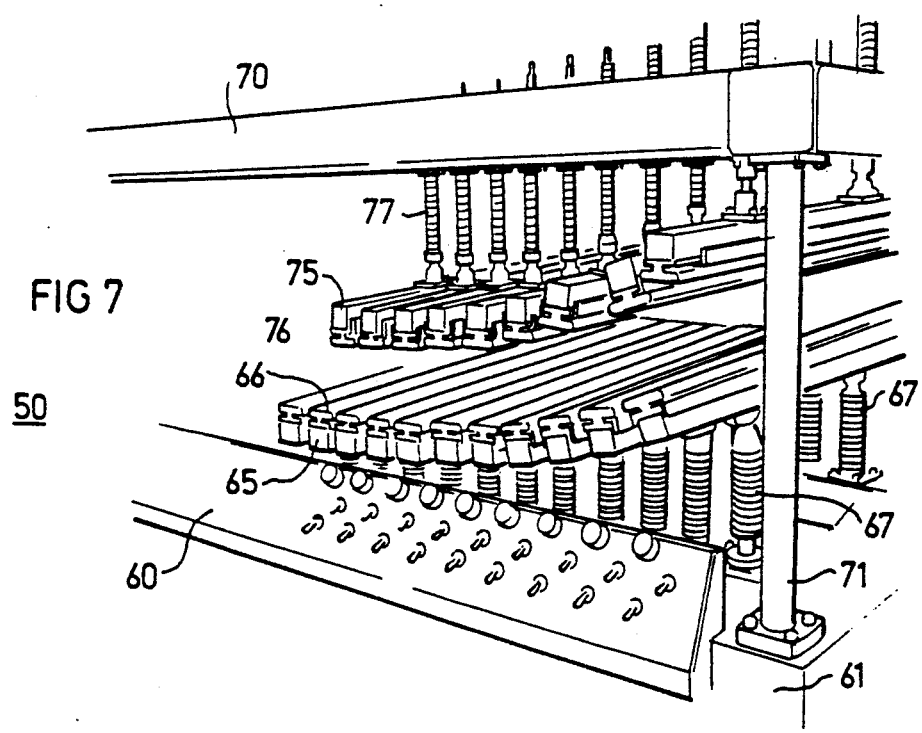
FIG. 7 is a fragmentary view illustrating another press useful in making laminated panels in accordance with the present invention.

FIG. 7 illustrates another form of press which may be used when applying the cold liquid adhesive to the two sheets. The press illustrated in FIG. 7, generally designated 50, also includes a lower fixed frame assembly 60, and an upper movable assembly 70 which is movable to either an open or a closed position with respect to the fixed frame assembly. The opening and closing of the movable frame assembly 70 may also be effected by telescoping vertical bars 61, 71 at each of the four corners of the two assemblies and actuated by a cylinder-piston device (not shown) at each of these corners.

The fixed frame assembly 60 also includes a plurality of pressure bars 65 extending transversely of the assembly and each adjustable to a selected vertical position according to the curvature of the panel to be produced.

In the press illustrated in FIG. 7, however, each of the pressure bars 65 is lined with an inflatable flat boot 66, e.g., of rubber or the like. The boots 66 directly contact the lower surface of the acrylic sheet used in producing the laminated panel, and apply the pressure during the application of the liquid adhesive between the two sheets.

Press 50 illustrated in FIG. 7 also provides another arrangement for adjusting the vertical positions of the pressure bars 65 to conform to the curvature (or flatness) of the laminated panel to be produced. In this case, each of the pressure bars 65 is vertically adjustable by a pair of screw-and-nut devices 67 securing the opposite ends of each pressure bar 65 to the lower frame assembly 60.

The pressure bars in the movable assembly 70, and therein designated 75, are similarly constructed and mounted as the pressure bars 66 in the fixed frame assembly 60. Thus, each pressure bar 75 in the movable frame assembly includes an inflatable flat boot 76 which directly contacts the outer surface of the polycarbonate sheet used in producing the laminated panel and applies pressure to that surface during the time of the injection of the transparent adhesive. Each of the pressure bars 75 in the movable frame assembly 70 is also mounted for vertical movement by a pair of screw-and-nut devices, shown at 77, secured to the opposite ends of each pressure bar.

The press illustrated in FIG. 7 is particularly useful for producing a run of laminated panels all of the same configuration. Thus, when each of the pressure bars 65, 75 is preset in its proper vertical position, according to the curvature (or flatness) of the laminated panel to be produced, the same setup may be used for producing the run of laminated panels. The method of producing the laminated panels is the same as described above with respect to the press of FIGS. 5 and 6, except that after the upper frame assembly 70 has been moved to its closed position, the boots 66 and 76 carried by the pressure bars 65 and 75 are inflated to firmly contact the opposite faces of the sheets being laminated and to prevent their distortion by the high pressure of injection of the transparent adhesive.

While the invention has been described with respect to two preferred embodiments, it will be appreciated that many other variations, modifications and applications of the invention may be made.

What is claimed is:

1. A transparent panel effective to block the penetration of a bullet when fired from the outer side of the panel but not when fired from the inner side of the panel, said transparent panel comprising: an outer transparent sheet of an acrylic resin having a thickness of 7.5-9 mm, and an inner transparent sheet of a polycarbonate resin having a thickness of 9.5-11 mm, said sheets being bonded together by a polyurethane transparent adhesive.

2. The panel according to claim 1, wherein said outer acrylic resin sheet has a thickness of about 8 mm, and said inner polycarbonate resin sheet has a thickness of about 10 mm.

3. The panel according to claim 1, wherein said transparent polyurethane adhesive has a thickness of about 2 mm.

4. The transparent panel according to claim 1, wherein each of said sheets includes a scratch-resistant coating on the face thereof not bonded to the other sheet.

5. The transparent panel according to claim 1, wherein both said sheets are of curved configuration.

* * * * *